US009338246B2

(12) United States Patent
Luo et al.

(10) Patent No.: US 9,338,246 B2
(45) Date of Patent: May 10, 2016

(54) METHOD AND SYSTEM FOR PUSHING MESSAGE BOX

(71) Applicant: TENCENT TECHNOLOGY (SHENZHEN) COMPANY LIMITED, Shenzhen, Guangdong (CN)

(72) Inventors: Yucai Luo, Shenzhen (CN); Jin Fan, Shenzhen (CN); Zhaokun Cui, Shenzhen (CN); Fei Huang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/082,838

(22) Filed: Nov. 18, 2013

(65) Prior Publication Data

US 2014/0095671 A1 Apr. 3, 2014

Related U.S. Application Data

(63) Continuation of application No. PCT/CN2013/080635, filed on Aug. 1, 2013.

(30) Foreign Application Priority Data

Aug. 24, 2012 (CN) .......................... 2012 1 0305550

(51) Int. Cl.
*H04L 29/08* (2006.01)
*H04L 12/58* (2006.01)
*H04L 12/18* (2006.01)

(52) U.S. Cl.
CPC ............ *H04L 67/26* (2013.01); *H04L 12/1859* (2013.01); *H04L 51/24* (2013.01)

(58) Field of Classification Search
None
See application file for complete search history.

(56) References Cited

U.S. PATENT DOCUMENTS

| 6,212,175 | B1 * | 4/2001 | Harsch .......................... 370/338 |
| 6,609,213 | B1 * | 8/2003 | Nguyen et al. ............... 714/4.12 |
| 7,251,782 | B1 | 7/2007 | Albers et al. |
| 7,594,176 | B1 | 9/2009 | English |

(Continued)

FOREIGN PATENT DOCUMENTS

CN 101827330 A 9/2010

OTHER PUBLICATIONS

State Intellectual Property Office of the People's Republic of China (ISR/CN), "International Search Report", China, Nov. 7, 2013.

(Continued)

*Primary Examiner* — Ranodhi Serrao
(74) *Attorney, Agent, or Firm* — Tim Tingkang Xia, Esq.; Locke Lord LLP

(57) ABSTRACT

Method and system for pushing a message box. The method includes sending, by a server, a data unique notification to a client when the server needs to send a message box; sending a message box receiving request having an identity to the server after receiving the data unique notification; pushing, by the server, data of the message box to the client after verifying the identity. By means of elaborate operations, such as the identity, a keep-alive communication mechanism and an active pushing mechanism as required which is controlled by the server, the present disclosure solves the problem of delay for pushing the message box, controls the risk of being attacked, and lowers the pressure to a pushing server brought by real-time pushing.

6 Claims, 7 Drawing Sheets

(56) References Cited

U.S. PATENT DOCUMENTS

| | | | |
|---|---|---|---|
| 2001/0034792 A1* | 10/2001 | Swildens | 709/238 |
| 2002/0013897 A1* | 1/2002 | McTernan et al. | 713/153 |
| 2003/0004830 A1 | 1/2003 | Frederick | |
| 2003/0225889 A1* | 12/2003 | Moutafov | 709/227 |
| 2003/0233594 A1* | 12/2003 | Earl | 714/4 |
| 2004/0264381 A1* | 12/2004 | Banerjee et al. | 370/252 |
| 2005/0010838 A1* | 1/2005 | Davies et al. | 714/100 |
| 2005/0050209 A1* | 3/2005 | Main | 709/229 |
| 2013/0073630 A1* | 3/2013 | Zhang | 709/204 |
| 2014/0215545 A1* | 7/2014 | Liang et al. | 725/116 |

OTHER PUBLICATIONS

State Intellectual Property Office of the People's Republic of China (ISR/CN), "Written Opinion of the International Searching Authority", China, Nov. 7, 2013.

* cited by examiner

METHOD AND SYSTEM FOR PUSHING MESSAGE BOX

CROSS-REFERENCE TO RELATED APPLICATIONS

This application is a continuation application of International Patent Application No. PCT/CN2013/080635, filed Aug. 1, 2013, which itself claims the priority to Chinese Patent Application No. 201210305550.5, filed Aug. 24, 2012 in the State Intellectual Property Office of P.R. China, which are hereby incorporated herein in their entireties by reference.

FIELD OF THE INVENTION

The present disclosure relates to a message box pushing technology, and in particular, to a method and a system for pushing a message box.

BACKGROUND OF THE INVENTION

Tips (prompting messages) are a function dynamically deployed by a background server to a client, which is mainly used to notify a user and increase the activeness. Its existing logic is that the client requests the background server for data, and the background server passively deploys the data. Referring to FIG. 1, the background server may push the Tips only through a heartbeat.

Because a time interval of the heartbeat is generally several minutes (for example, 6 minutes) which may not meet certain real-time requirements, a method for active pushing needs to be used. However, as for application software, such as computer housekeeping software, having comparatively high requirements for security, when pushing the Tips in real time, a communication port of the software which needs being opened may have a risk of being used. Meanwhile, a real-time pushing Tips logic of other existing services may impose a great pressure on the background server.

Therefore, a heretofore unaddressed need exists in the art to address the aforementioned deficiencies and inadequacies.

SUMMARY OF THE INVENTION

In one aspect, the present disclosure is directed to a method for pushing a message box, which solves problems of delay when pushing the message box as well as security.

In one embodiment, the method for pushing a message box includes sending, by a server, a data unique notification to a client when the server needs to send a message box; sending, by the client, a message box receiving request having an identity to the server after receiving the data unique notification; and pushing, by the server, message box data to the client after verifying the identity.

In another aspect, the present disclosure relates to a system for pushing a message box. In one embodiment, the system has a data notification module, configured to send a data unique notification to a client when a message box needs to be sent; a message request module, configured to send a message box receiving request having an identity to a server after receiving the data unique notification; and a message pushing module, configured to push message box data to the client after verifying the identity.

In yet another aspect, the present disclosure relates to a non-transitory computer-readable storage medium storing instructions which, when executed by one or more processors, cause the system to perform the method, as disclosed above, for pushing a message box.

By means of elaborate operations, such as the identity, the keep-alive communication mechanism, and the active pushing mechanism as required which is controlled by the server, the present disclosure solves the delay for pushing the message box, controls a risk of being attacked, and lowers the pressure to a pushing server brought by the real-time pushing.

These and other aspects of the present disclosure will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the invention.

DETAILED DESCRIPTION OF THE INVENTION

Figure 1:
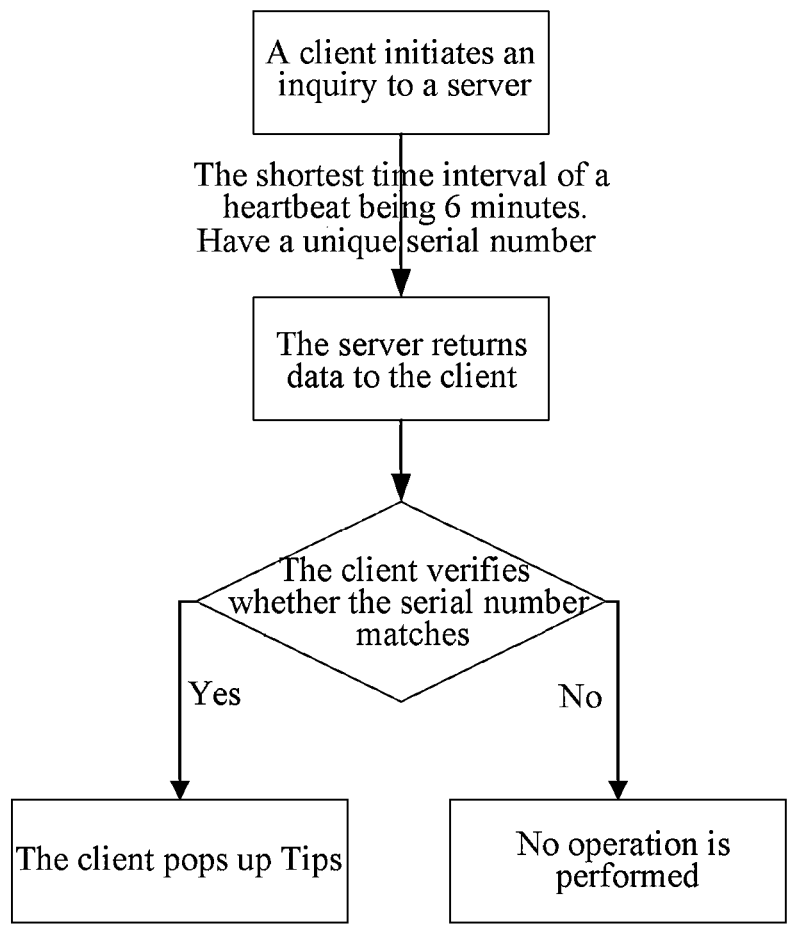
FIG. 1 is a schematic flowchart of a pushing mechanism in the prior art.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the embodiments of the present disclosure in conjunction with the accompanying drawings in FIGS. 1-8. It should be understood that specific embodiments described herein are merely intended to explain the present disclosure, but not intended to limit the present disclosure. In accordance with the purposes of this invention, as embodied and broadly described herein, this invention, in one aspect, relates to method and system for pushing a message box, and a non-transitory computer-readable medium storing instructions which, when executed by one or more processors, cause the system to perform the method for pushing a message box.

Figure 2:
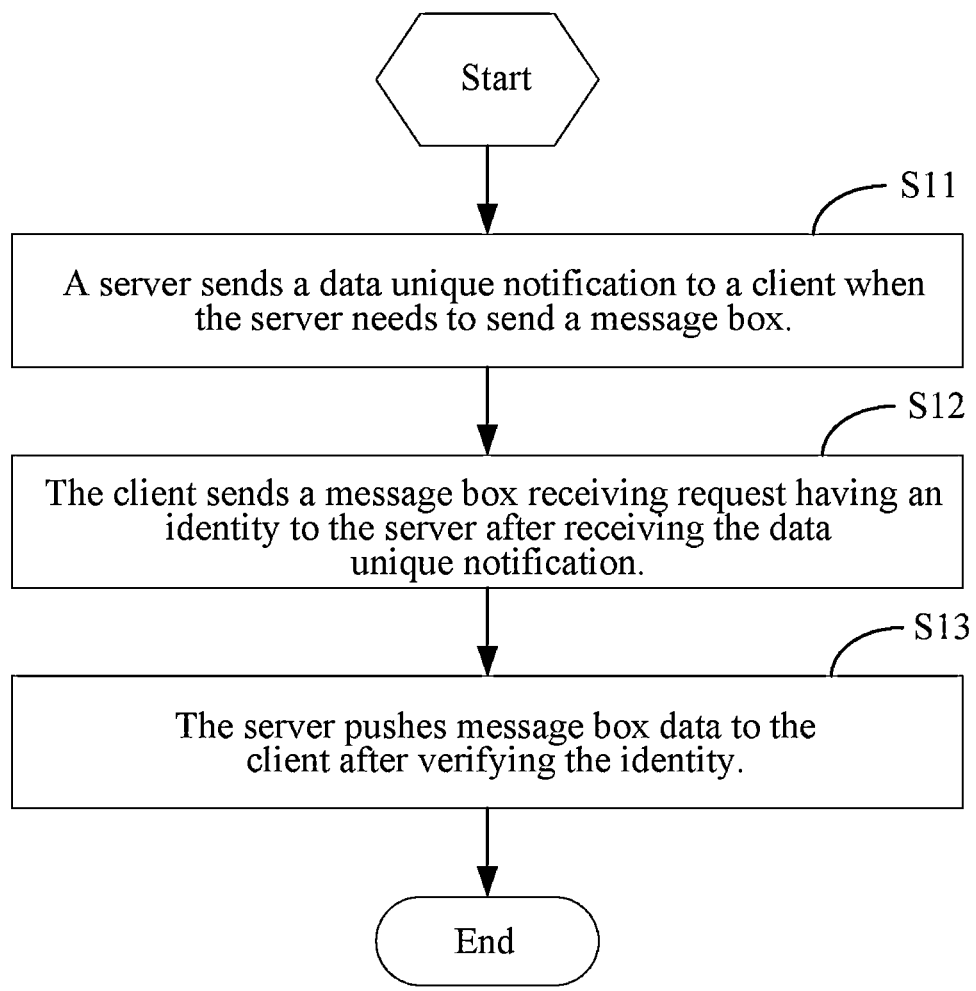
FIG. 2 is a schematic flowchart of a method for pushing a message box according to one embodiment of the present disclosure.

Referring to FIG. 2, a flowchart of the method for pushing a message box is provided according to one embodiment of the present disclosure. The method includes the following steps:

At step S11: A server sends a data unique notification to a client when the server needs to send a message box;

At step S12: The client sends a message box receiving request having an identity to the server after receiving the data unique notification; and At step S13: The server pushes data of the message box to the client after verifying the identity.

To solve problems of the delay of Tips from a background (for example, a server) to the client as well as security, the method for pushing the message box may send, through the server, the data unique notification which may identify a server identity to the client when the message box (Tips) needs to be sent, so as to trigger the client to initiate an inquiry also having the identity (a dynamic key) to the server, so that the server sends the message box data to the client after the verification is passed, which reduces the delay for pushing the message box through real-time pushing, and controls a risk of being attacked through a unique notification identity.

The foregoing data unique notification includes at least a unique identification symbol of a message box service and a keep-alive command for triggering the client, which may not only set the unique identification symbol for the server with respect to the message box of each client, but also trigger the client to send a message box keep-alive request having a client identity to the server.

In the embodiment, an interception port may be opened on the client so as to intercept data actively pushed by the server. A resident process needs to be set in the client to open the interception port, and a service is provided to other application in a form of a plug-in interface. Because what is sent by the server to the client is the data unique notification, a risk of being used and attacked can be controlled, and the delay is shortened within milliseconds.

If the foregoing method for pushing the message box is applied to a computer security management application, such as a computer housekeeping software, because the application generally has a set of network CS (client/server) communication mechanisms, active pushing may be built based on a CS network library. A real-time pushing pass needs a resident process to provide a service, and service logic is implemented based on a network. In one embodiment, a keep-alive mechanism may be independent of an existing network service protocol. In a normal status, the keep-alive mechanism may be either closed, or controlled to be closed by the server performing pushing. The pushing service may work as required, and is different from timing pushing which may generate a large number of data packets. Therefore, the pushing service may not impose pressure on access, and the problem for the pushing server having too much pressure after a real-time pushing is solved.

In the embodiment, when a Tips update in the pushing server needs to be sent, it is first judged through logic whether the Tips level needs to be pushed in real time. If yes, the data unique notification is pushed to the client in real time, and the client is triggered to initiate a keep-alive request through a keep-alive command newly added in a CS communication mechanism. When the client is started, a query server for the keep-alive request does not need to be initiated, but needs to wait for the data unique notification of the server. After the client is triggered, a keep-alive request having a unique serial number (a dynamic key) is immediately sent to the server. After receiving the request, the server returns corresponding data (a pushing packet) which has a keep-alive key (a keep-alive key). Then, referring to FIG. 3, the client verifies again the keep-alive key, and corresponding Tips is popped up after the verification is passed, otherwise, no operation is performed.

The server may further select a proper client based on a preset rule, and triggers the selected client to initiate a query of the keep-alive request, so as to accurately locate a client of the real-time Tips, and push the real-time Tips to a specific client or a client in a specific area.

Figure 4:
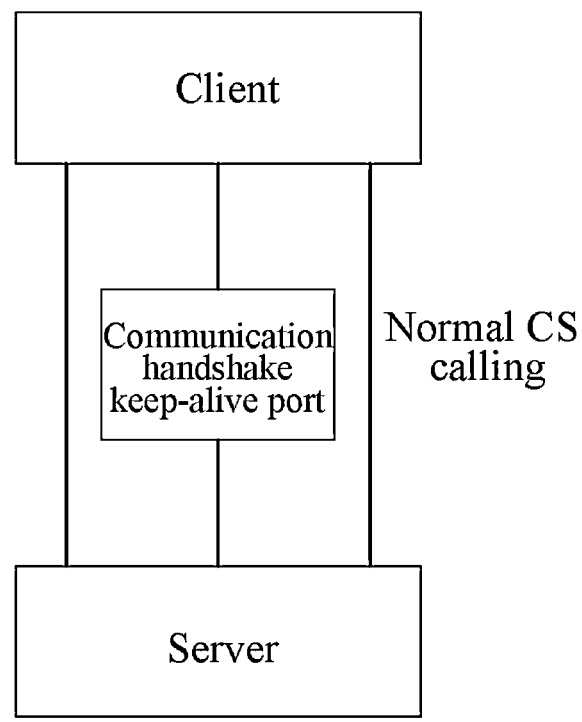
FIG. 4 is a schematic diagram of development logic according to one embodiment of the present disclosure.

Referring to FIG. 4, a schematic diagram of development logic according to one embodiment of the present disclosure is shown. Active pushing of Tips in this embodiment is building a keep-alive path according to a normal CS communication mechanism. Opening and closing of the keep-alive path are controlled by a server.

Figure 5:
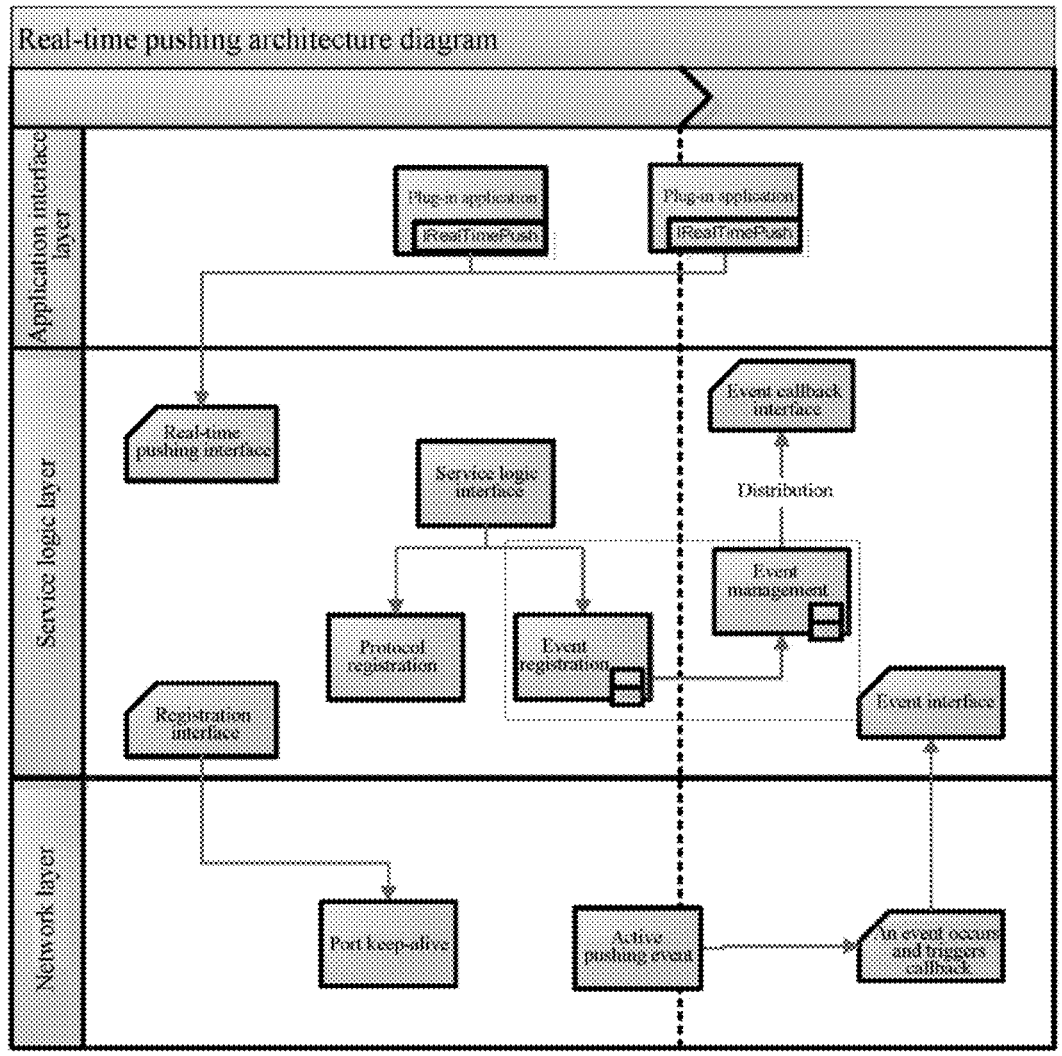
FIG. 5 is a schematic diagram of real-time pushing architecture of a client according to one embodiment of the present disclosure.

Referring to FIG. 5, a schematic diagram of real-time pushing architecture of a client according to one embodiment of the present disclosure is shown. The real-time pushing architecture of the client mainly includes a network layer, a service logic layer, and an application interface layer. A keep-alive path is built in advance though a register interface between the network layer and the service logic layer. When an active pushing event occurs in a server, the network layer communicates with an event management of the service logic layer through an event interface, and the event management is responsible for allocating an event callback interface. The event callback interface may communicate with a plug-in application in the application interface layer. The application interface layer communicates with the service logic layer through a real-time pushing interface, and calls a specific service logic interface to respond to the pushing.

Figure 6:
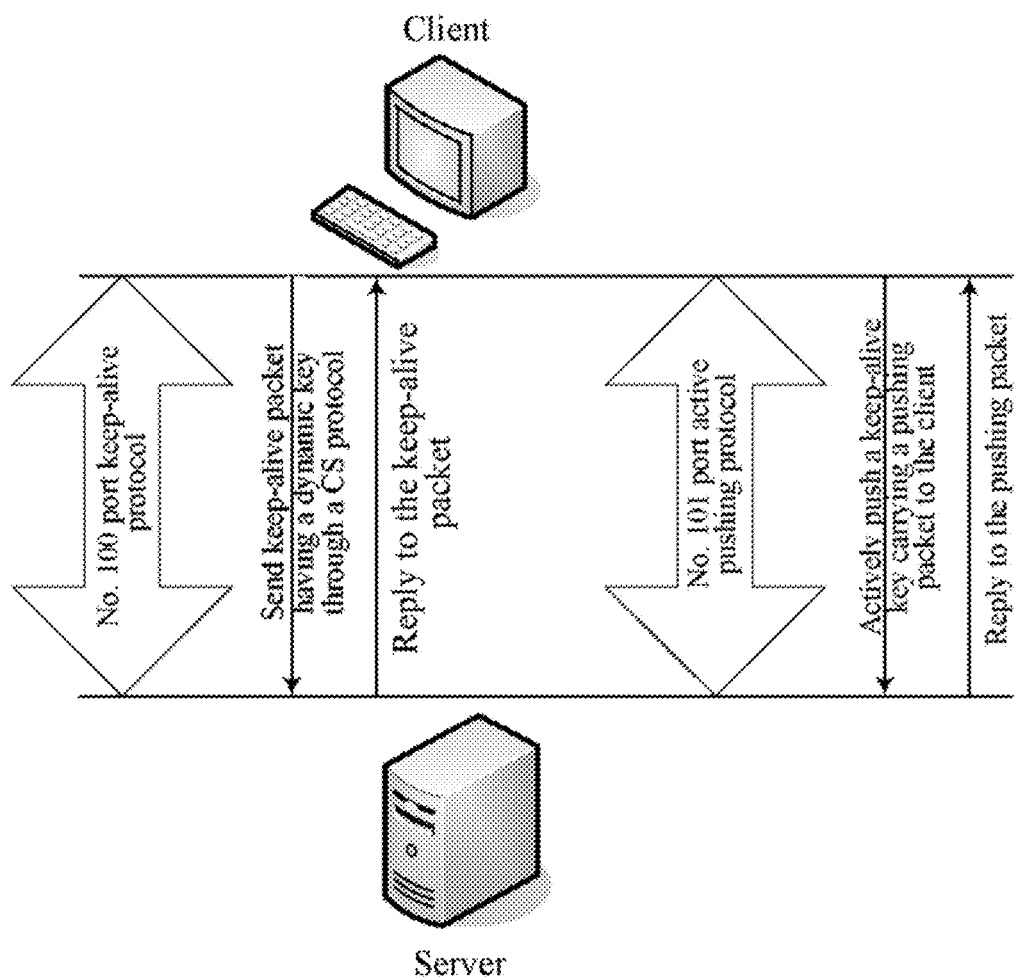
FIG. 6 is a schematic diagram of communication between a real-time pushing client and a server according to one embodiment of the present disclosure.

Referring to FIG. 6, after being triggered, the client sends a keep-alive packet to the server through a No. 100 port keep-alive protocol based on a CS protocol, where the keep-alive packet also has a dynamic key generated by the client. After receiving the keep-alive packet, the server replies to the keep-alive packet. Then, the server actively pushes the keep-alive key carrying a pushing packet to the client through a No. 101 port active pushing protocol. After receiving the pushing packet, the client replies to the pushing packet.

By means of elaborate operations, such as the identity, the keep-alive communication mechanism and the active pushing mechanism as required which is controlled by the server, the foregoing method for pushing the message box solves the problem of delay for pushing the message box, controls the risk of being attacked, and lowers the pressure to a pushing server brought by the real-time pushing.

Figure 7:
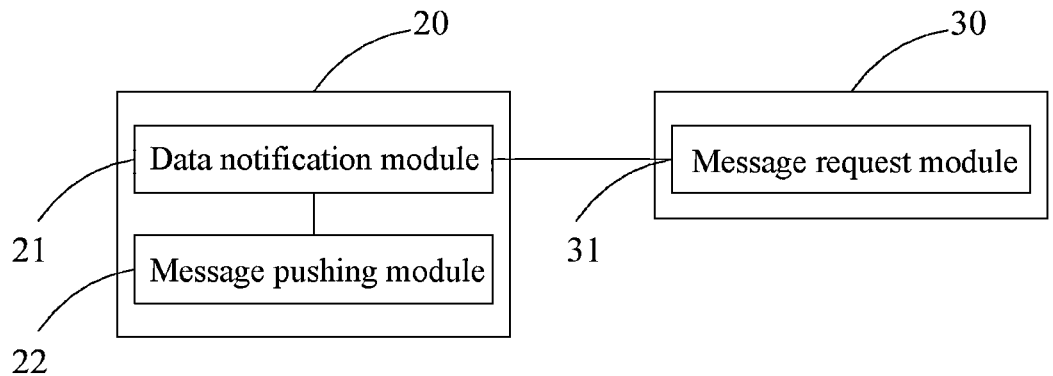
FIG. 7 is a schematic structural diagram of a system for pushing a message box according to one embodiment of the present disclosure.

Referring to FIG. 7, a system for pushing a message box is provided according to one embodiment of the present disclosure. The system includes a data notification module 21, a message request module 31, and a message pushing module 22. The data notification module 21 is configured to send a data unique notification to a client when a message box needs to be sent. The message request module 31 is configured to send a message box receiving request having an identity to a server after receiving the data unique notification. The message pushing module 22 is configured to push message box data to the client after verifying the identity. In this embodiment, the foregoing system for pushing the message box may be provided with a server 20 and a client 30. The data notification module 21 and the message pushing module 22 may be disposed in the server 20, and the message request module 31 may be disposed in the client 30.

To solve problems of the delay of Tips from a background (the server 20) to the client 30 as well as security, the foregoing system for pushing the message box may send, through the data notification module 21 of the server 20, the data unique notification capable of identifying an identity of the server 20 to the client 30 when the message box (Tips) needs to be sent, so as to trigger the message request module 31 of the client 30 to initiate an inquiry also having an identity (a dynamic key) to the server 20, so that the message pushing module 22 of the server 20 sends the message box data to the client 30 after the identity verification is passed, which may reduce the delay for pushing the message box through real-time pushing, and control the risk of being attacked through a unique notification identity.

The foregoing data unique notification has at least a unique identification symbol of a message box service and a keep-alive command for triggering the client 30, which may not only set a unique identification symbol for the server 20 with respect to the message box of each client 30, but also trigger the client 30 to send a message box keep-alive request having a client 30 identity to the server 20.

In this embodiment, an interception port may be opened on the client 30 so as to intercept data actively pushed by the server 20. A resident process needs to be set in the client 30 to open the interception port, and a service is provided to other application in a form of a plug-in interface. Because what is sent by the server 20 to the client 30 is the data unique notification, the risk of being used and attacked can be controlled, and the delay is shortened within milliseconds.

When the foregoing system for pushing the message box is applied to a computer security management application, such as a computer housekeeping software, active pushing may be built based on a CS network library since the application generally has a set of network CS (client/server) communication mechanisms. A real-time pushing pass needs a resident process to provide a service, and service logic is implemented based on a network. A keep-alive mechanism may be independent of an existing network service protocol. In a normal status, the keep-alive mechanism may be either closed, or controlled to be closed by the server 20 performing pushing. The pushing service may work as required, and is different from timing pushing which may generate a large number of data packets. Therefore, the pushing service may not impose pressure on access, and the problem for the pushing server having too much pressure after a real-time pushing is solved.

Figure 8:
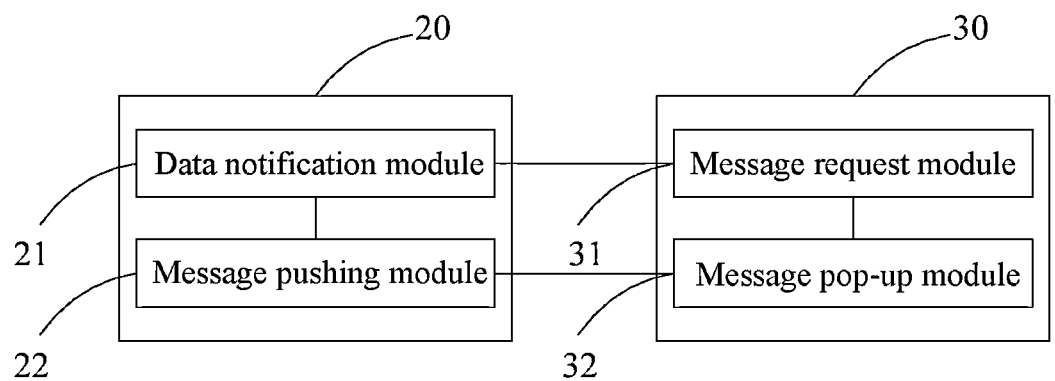
FIG. 8 is a schematic structural diagram of a system for pushing a message box according to another embodiment of the present disclosure.

Referring to FIG. 8, the foregoing system may further include: a message pop-up module, configured to verify the keep-alive key, and pop up the message box when the verification is passed. The message pop-up module may be disposed in the client 30.

Figure 3:
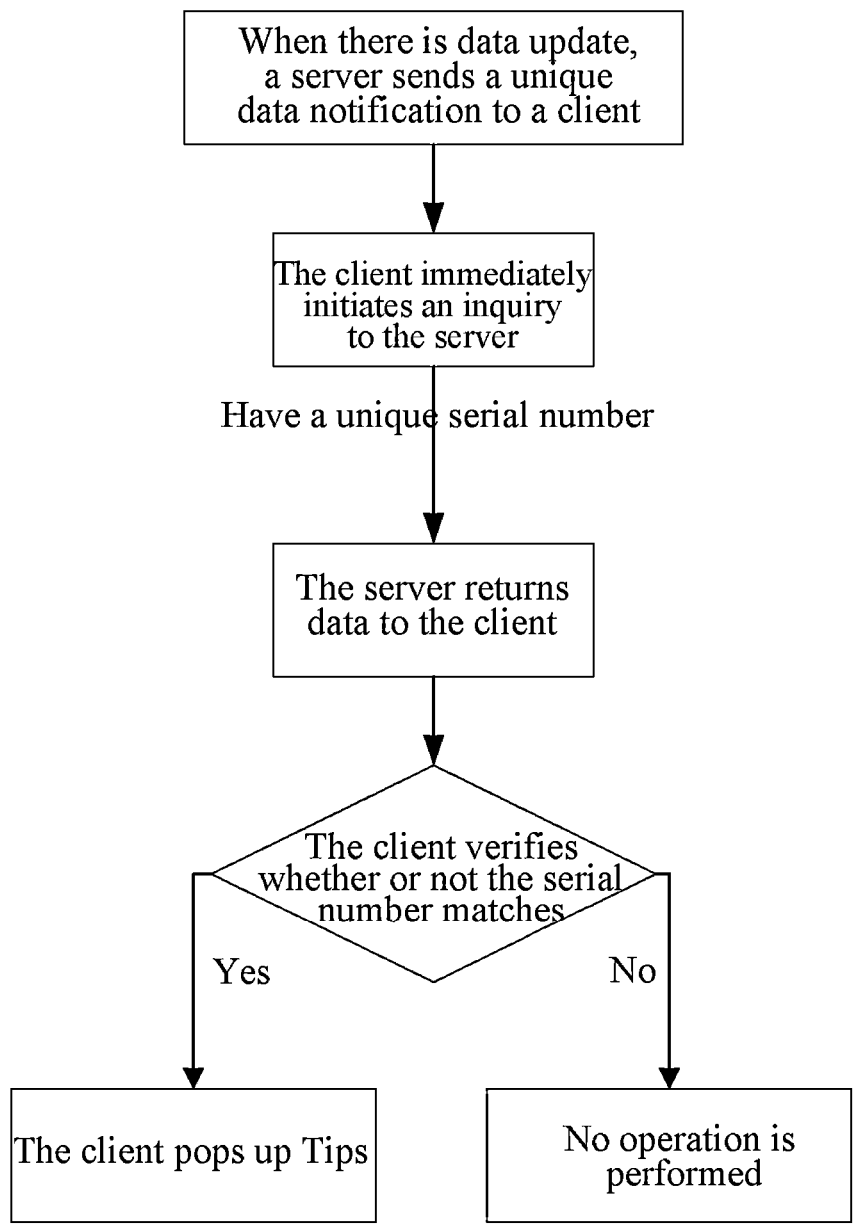
FIG. 3 is a schematic flowchart of a real-time pushing mechanism according to one embodiment of the present disclosure.

In one embodiment, when a Tips update in the pushing server needs to be sent, it is first judged through logic whether the Tips level needs to be pushed in real time. If yes, the data unique notification is pushed to the client 30 in real time, and the client 30 is triggered to initiate a keep-alive request through a keep-alive command newly added in a CS communication mechanism. The client 30, when being started, does not need to trigger a query server 20 for the keep-alive request, but needs to wait for the data unique notification of the server 20. After the client 30 is triggered, a keep-alive request having a unique serial number (a dynamic key) is immediately sent to the server 20, and after receiving the request, the server 20 returns corresponding data (a pushing packet) having a keep-alive key (a keep-alive key). Then, the message pop-up module of the client 30 verifies again the keep-alive key and pops up corresponding Tips after the verification is passed, otherwise, no operation is performed, as shown in FIG. 3.

The message pushing module 22 of the server 20 may further select a proper client 30 based on a preset rule, and triggers the selected client 30 to initiate a query of the keep-alive request, so as to accurately locate a client 30 of the real-time Tips, and also push the real-time Tips to a specific client 30 or a client 30 in a specific area.

Referring to FIG. 4, a schematic diagram of development logic according to this embodiment is shown. Active pushing of Tips in the embodiment is building a keep-alive path according to a normal CS communication mechanism. Opening and closing of the keep-alive path are controlled by the server 20.

Referring to FIG. 5, a schematic diagram of real-time pushing architecture of the client 30 according to this embodiment is shown. The real-time pushing architecture of the client 30 mainly includes a network layer, a service logic layer, and an application interface layer. A keep-alive path is built in advance though a register interface between the network layer and the service logic layer. When an active pushing event occurs in the server 20, the network layer communicates with an event management of the service logic layer through an event interface, and the event management is responsible for distributing an event callback interface. The event callback interface may communicate with a plug-in application in the application interface layer. The application interface layer communicates with the service logic layer through a real-time pushing interface, and calls a specific service logic interface to respond to the pushing.

FIG. 6 shows a schematic diagram of communication between a real-time pushing client and a server according to one embodiment of the present disclosure. In this example, after being triggered, the message request module 31 of the client 30 sends a keep-alive packet to the server 20 through a No. 100 port keep-alive protocol based on a CS protocol, and the keep-alive packet also has a dynamic key generated by the client 30. After receiving the keep-alive packet, the server 20 replies to the keep-alive packet. Then, the message pushing module 22 of the server 20 actively pushes the keep-alive key carrying a pushing packet to the client 30 through a No. 101 port active pushing protocol. After receiving the pushing packet, the client 30 replies to the pushing packet.

By means of elaborate operations, such as the identity, the keep-alive communication mechanism and the active pushing mechanism as required which is controlled by the server 20, the foregoing system for pushing the message box solves the problem of delay for pushing the message box, controls the risk of being attacked, and lowers the pressure to a pushing server brought by the real-time pushing.

Yet another aspect of the present disclosure provides a non-transitory tangible computer-readable storage medium storing instructions or codes which, when executed by one or more processors, cause the above system to perform the above method for pushing the message box. The non-transitory tangible computer-readable storage medium includes, but not limited to, disk, CD-ROM, read-only memory (ROM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for pushing a message box, comprising:
   sending, by a server, a data unique notification to a client when the server needs to send a message box, wherein the data unique notification comprises at least a unique identification symbol of a message box service and a keep-alive command for triggering the client;
   sending, by the client, a message box receiving request having an identity to the server after receiving the data unique notification;
   in response to receiving the message box receiving request from the client, pushing, by the server, data of the message box to the client after verifying the identity, wherein the step of pushing, by the server, the data of the message box to the client after verifying the identity comprises actively pushing, by the server, a pushing packet having a keep-alive key to the client through another set port active pushing protocol; and
   verifying, by the client, the keep-alive key, and popping up the message box when the verification is passed.

2. The method according to claim 1, wherein the step of sending, by the client, the message box receiving request having the identity to the server after receiving the data unique notification comprises:
   according to triggering of the data unique notification, sending, by the client through setting a port keep-alive protocol, a message box keep-alive request having a client identity based on a client/server (CS) protocol.

3. A system for pushing a message box, comprising:
   a server; and
   a client in communication to the server,
   wherein the server comprises:
   a data notification module, configured to send a data unique notification to the client when the message box needs to be sent, wherein the data unique notification comprises at least a unique identification symbol of a message box service and a keep-alive command for triggering the client;
   a message pushing module, configured to receive the message box receiving request from the client, and push data of the message box to the client after verifying an identity of the client, and actively push a pushing packet having a keep-alive key to the client through another set port active pushing protocol; and
   wherein the client comprises:
   a message request module, configured to send a message box receiving request having the identity of the client to the server after receiving the data unique notification; and
   a message pop-up module, configured to verify the keep-alive key, and pop up the message box when the verification is passed.

4. The system according to claim 3, wherein the message request module is further configured to:
   according to triggering of the data unique notification, send, through setting a port keep-alive protocol, a message box keep-alive request having a client identity based on a (CS) protocol.

5. A non-transitory computer-readable storage medium storing instructions which, when executed by one or more processors, cause a system to perform a method for pushing a message box, the method comprising:
   sending, by a server, a data unique notification to a client when the server needs to send a message box, wherein the data unique notification comprises at least a unique identification symbol of a message box service and a keep-alive command for triggering the client;

sending, by the client, a message box receiving request having an identity to the server after receiving the data unique notification;

in response to receiving the message box receiving request from the client, pushing, by the server, data of the message box to the client after verifying the identity, wherein the step of pushing, by the server, the data of the message box to the client after verifying the identity comprises actively pushing, by the server, a pushing packet having a keep-alive key to the client through another set port active pushing protocol; and verifying, by the client, the keep-alive key, and popping up the message box when the verification is passed.

6. The non-transitory computer-readable storage medium according to claim 5, wherein the step of sending, by the client, the message box receiving request having the identity to the server after receiving the data unique notification comprises:

according to triggering of the data unique notification, sending, by the client through setting a port keep-alive protocol, a message box keep-alive request having a client identity based on a client/server (CS) protocol.

\* \* \* \* \*